Sept. 26, 1944.   I. A. KENAGA   2,359,221
RECOVERY AND PURIFICATION OF BROMINE
Filed April 29, 1941
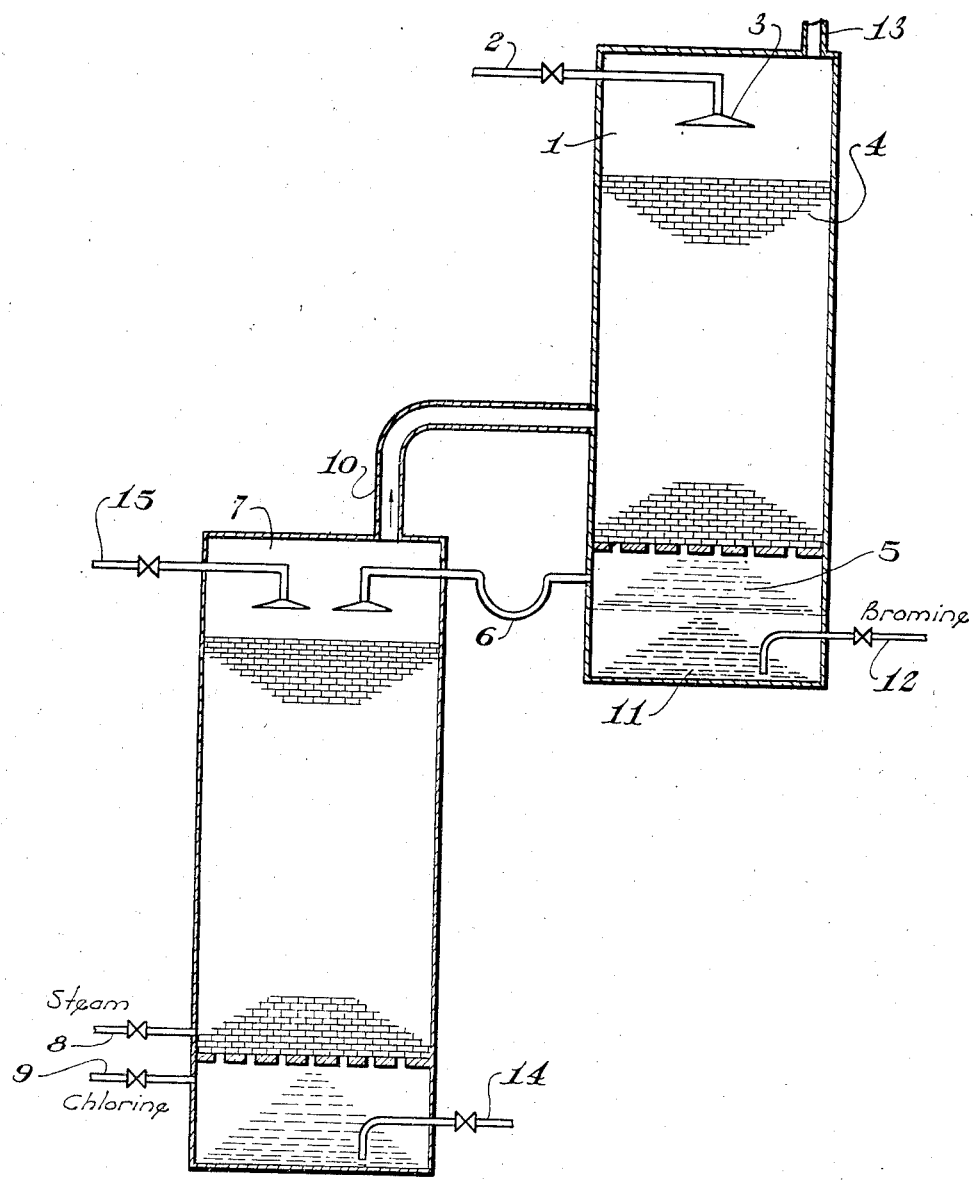
INVENTOR
Ivan A. Kenaga
BY
Griswold & Burdick
ATTORNEYS Patented Sept. 26, 1944

2,359,221

UNITED STATES PATENT OFFICE 2,359,221

RECOVERY AND PURIFICATION OF BROMINE

Ivan A. Kenaga, Midland, Mich., assignor to The Dow Chemical Company, Midland, Mich., a corporation of Michigan Application April 29, 1941, Serial No. 390,915

4 Claims. (Cl. 23—216)

The present invention relates to a process for extracting bromine from aqueous solutions, e. g. natural salines, bitterns, or other solutions wherein it is contained in combined form, chiefly as bromides. It more particularly concerns an improved process for the continuous recovery of substantially chlorine-free liquid bromine from bromide containing solutions.

A well known process for the recovery of bromine from bromide containing solutions consists in introducing an acidified bromide containing solution and chlorine into a suitably heated tower in countercurrent relation whereby the chlorine liberates the bromine. The latter is then steamed out of the solution and recovered in various ways such as by combining it with iron turnings or by condensing it as liquid bromine. In employing the latter procedure wherein the liberated bromine is condensed as liquid bromine, one practice has been to employ the method described in U. S. Patent 1,902,801. This practice consists in condensing the vapors issuing from the steaming-out tower, separating the aqueous condensate from the liquid bromine and thereafter purifying the chlorine contaminated bromine by passing air through the liquid bromine whereby the chlorine, due to a higher vapor pressure than the bromine, is largely removed.

The present invention contemplates an improved method of recovering bromine from bromide containing solutions particularly in that phase of the process dealing with the condensation, purification, and recovery of the bromine. The method of this invention comprises passing the bromine vapor to be condensed through the bromide containing solution from which bromine is to be later extracted whereby the bromine vapor is condensed by direct contact with the bromide solution, and thereafter intimately contacted in the liquid phase by the bromide solution. I have found that by causing the liquid bromide solution to flow down through a tower in countercurrent relation to the bromine vapor, intimate contact between the vapor and the bromide solution is assured so as to bring about condensation and at the same time purification or removal of chlorine.

By the foregoing procedure the bromine vapor is condensed and at the same time purified of substantially all of the chlorine contained therein so that, as it separates from the aqueous condensate at the bottom of the tower, it may be withdrawn in a purified condition. In addition, by employing a bromide solution, from which bromine is to be later extracted, as the condensing medium, a notable overall saving in the process is effected, since (1) condensing water does not have to be supplied to this step of the process at an additional cost, (2) all the free chlorine is effectively utilized in reacting with bromide solution which is to be later chlorinated for freeing the bromine therein, and (3) the heat absorbed by the bromide solution employed as the condensing medium is not wasted as is the case if condensing water is employed since the bromide solution must be heated in any case prior to or during the chlorination step.

The invention will be more readily understood from the following description taken in connection with the accompanying drawing wherein:

The single figure illustrates somewhat diagrammatically a preferred arrangement of apparatus adapted for carrying out the improved process. Referring to the drawing a bromide solution from which the bromine is to be extracted is introduced into condenser tower 1 through pipe 2 and distributor 3. The bromide solution is distributed over any suitable packing material 4 such as raschig rings. The bromide solution collecting at the bottom of the tower 1 in an aqueous layer 5 is led off through a trapped pipe 6 into the top of steaming-out tower 7. At the same time steam and chlorine are introduced at the bottom of tower 7 through steam line 8 and chlorine line 9. The bromide liquor flowing down through tower 7 is freed of bromine by the combined action of the steam and chlorine, the chlorine acting to convert the bromides to bromine and the steam vaporizing and blowing the dissolved bromine out of the solution. The hot gases are conducted out of tower 7 through conduit 10 and into tower 1 at a point about the middle thereof. The hot gases comprising a mixture of bromine, chlorine and water vapor start to ascend through tower 1 but on coming in contact with the cold bromide solution are condensed and to some extent absorbed thereby. Any free chlorine reacts with the bromides in the solution and is thus absorbed while the condensed bromine which may contain some dissolved chlorine is further intimately contacted by the bromide solution as it flows on down through the packed tower. This action completes the removal of chlorine from the bromine so that substantially chlorine-free bromine separates in layer 11 at the bottom of tower 1. Conduit 12 at the bottom of tower 1 serves as a means whereby the purified bromine may be withdrawn from the tower. A suitable vent pipe 13 may be provided at the top of tower 1 for the escape of any uncondensed gases. The steamed-out liquor reaching the bottom of tower 7 is forwarded to waste through pipe 14. In some instances it may be desirable to introduce additional bromide containing solution into the steaming-out tower as through pipe 15 in order to increase the bromine output of the process.

In order to assure that the bromine is quickly and completely liberated, the temperature of the steaming-out tower may range from about 100° C. at the bottom to about 80° to 90° C. at the top thereof. The bromide containing solution introduced into tower 1 as the condensing medium should have an initial temperature such that an amount of condensing medium need not be employed which will dissolve an excessive amount of the condensed bromine thus greatly reducing the efficiency of the process. It has been found that bromide solution having a temperature below about 40° C. and preferably between about 20° to 30° C. is generally satisfactory for efficient operation of the process and satisfactory recovery of bromine for each cycle. The amount and initial temperature of the bromide solution is further controlled so that the aqueous layer gathering at the bottom of tower 1 is maintained below about 50° C. in order to eliminate any tendency of the bromine to revaporize.

An amount of chlorine should be employed so that a slight excess is present in the gases leaving the steaming-out tower over that necessary to completely oxidize and liberate the bromide as bromine. The presence of such an amount of chlorine may be determined in any convenient way, e. g. as by measuring the oxidation potential of free bromine in contact with a solution of its ions which serves to indicate the completeness of the oxidation of the bromide to bromine as well as the presence of a slight excess of chlorine. In employing this method in conjunction with the instant process, it will be desirable to continuously or intermittently sample and condense a small quantity of the gases issuing from the steaming-out tower. The condensed sample is then passed in contact with suitable platinum-calomel electrodes and the oxidation potential measured on a potentiometer or other recording device. The oxidation potential recorded will serve to indicate whether more or less chlorine must be added to give the desired excess.

I claim:

1. In a method of extracting bromine from an aqueous bromide solution, the steps which consist in (1) flowing the aqueous bromide solution at a temperature below about 40° C. in countercurrent contacting relation to the hot bromine-residual chlorine-water vapor mixture produced in a subsequent step, the volume and initial temperature of said bromide solution being sufficient to prevent its temperature rising above about 50° C., and its bromide content being in excess of that equivalent to the chlorine in the vapor mixture, thereby condensing the bromine to chlorine-free liquid, heating the bromide solution and saturating it with bromine, and absorbing the residual chlorine in the heated bromide solution; (2) separating the undissolved condensed chlorine-free bromine from the bromine-saturated heated bromide solution; (3) flowing the bromine-saturated heated bromide solution in countercurrent contacting relation to chlorine and steam, the amount of the chlorine being slightly in excess of that equivalent to the bromide content of the aqueous bromide solution employed in this step and the amount of the steam at least being sufficient to heat the same to the boiling point and yield a vapor having a temperature of at least 80° C., so as to liberate the bromine and vaporize it and the residual chlorine, thereby producing a hot bromine-residual chlorine-water vapor mixture; and (4) delivering the hot vapor mixture so obtained to the first step.

2. In a method of extracting bromine from two aqueous bromide solutions, the steps which consist in (1) flowing one of the aqueous bromide solutions at a temperature below about 40° C. in countercurrent contacting relation to the hot bromine-residual chlorine-water vapor mixture produced in a subsequent step, the volume and initial temperature of said bromide solution being sufficient to prevent its temperature rising above about 50° C., and its bromide content being in excess of that equivalent to the chlorine in the vapor mixture, thereby condensing the bromine to chlorine-free liquid, heating the bromide solution and saturating it with bromine, and absorbing the residual chlorine in the bromide solution; (2) separating the undissolved condensed chlorine-free bromine from the bromine-saturated heated bromide solution; (3) flowing the bromine-saturated heated bromide solution together with the other aqueous bromide solution in countercurrent contacting relation to chlorine and steam, the amount of the chlorine being slightly in excess of that equivalent to the bromide content of all the aqueous bromide solution employed in this step and the amount of the steam at least being sufficient to heat the same to the boiling point and to yield a vapor having a temperature of at least 80° C., so as to liberate the bromine and vaporize it and the residual chlorine, thereby producing a hot bromine-residual chlorine-water vapor mixture; and (4) delivering the hot vapor mixture so obtained to the first step.

3. In a method of extracting bromine from an aqueous bromide solution, the steps which consist in (1) flowing a portion of the aqueous bromide solution at a temperature below about 40° C. in countercurrent contacting relation to the hot bromine-residual chlorine-water vapor mixture produced in a subsequent step, the volume and initial temperature of said portion of the aqueous bromide solution being sufficient to prevent its temperature rising above about 50° C., and its bromide content being in excess of that equivalent to the chlorine in the vapor mixture, thereby condensing the bromine to chlorine-free liquid, heating the bromide solution, saturating it with bromine, and absorbing the residual chlorine in the heated bromide solution; (2) separating the undissolved condensed chlorine-free bromine from the bromine-saturated heated bromide solution; (3) flowing the bromine-saturated heated bromide solution and another portion of the aqueous bromide solution in countercurrent contacting relation to chlorine and steam, the amount of the chlorine being slightly in excess of that equivalent to the bromide of the aqueous bromide solutions employed in this step and the amount of the steam being sufficient to heat the same to the boiling point and yield a vapor having a temperature of at least 80° C., so as to liberate the bromine and vaporize it and the residual chlorine, thereby producing a hot bromine-residual chlorine-water vapor mixture; and (4) delivering the hot vapor mixture so obtained to the first step.

4. In a method of extracting bromine from an aqueous bromide solution, the steps which consist in (1) flowing the bromide solution downwardly through a packed tower in countercurrent contacting relation to an ascending hot bromine-residual chlorine-water vapor mixture produced in a later step and introduced into the tower near its lower end, the volume and initial temperature of the said bromide solution being sufficient to prevent its temperature rising above about 50° C., and its bromide content being in excess of that equivalent to the chlorine in the vapor mixture, thereby condensing the bromine to chlorine-free liquid, heating the bromide solution and saturating it with bromine, and absorbing the residual chlorine in the heated bromide solution; (2) collecting and separating the undissolved condensed chlorine-free bromine in the lower end of the tower from the bromine-saturated heated bromide solution; (3) flowing the bromine-saturated heated bromide solution downwardly through another packed tower in countercurrent contacting relation to an ascending flow of steam and chlorine introduced near the base of the tower, the amount of the chlorine being slightly in excess of that equivalent to the bromide content of the aqueous bromide solution employed in this step and the amount of the steam at least being sufficient to heat the aqueous solution reaching the base of the tower to the boiling point and yield a vapor at the top of the tower having a a temperature of at least 80° C., so as to liberate the bromine and vaporize it and the residual chlorine, thereby producing a hot bromine-residual chlorine-water vapor mixture; and (4) delivering the hot vapor mixture so obtained to the first step.

IVAN A. KENAGA.